United States Patent [19]

Shiomoto et al.

(10) Patent No.: US 6,639,897 B1
(45) Date of Patent: Oct. 28, 2003

(54) COMMUNICATION NETWORK OF LINKED NODES FOR SELECTING THE SHORTEST AVAILABLE ROUTE

(75) Inventors: Kohei Shiomoto, Tokyo (JP); Naoaki Yamanaka, Tokyo (JP)

(73) Assignee: Nippon Telegraph and Telephone Corporation, Shinjuku-ku (JP)

( * ) Notice: Subject to any disclaimer, the term of this patent is extended or adjusted under 35 U.S.C. 154(b) by 0 days.

(21) Appl. No.: 09/296,546

(22) Filed: Apr. 22, 1999

(30) Foreign Application Priority Data

Apr. 22, 1998 (JP) .......................... 10-112347
Feb. 15, 1999 (JP) .......................... 11-035848

(51) Int. Cl.[7] .............................................. H04J 12/28
(52) U.S. Cl. ................................... 370/238; 370/395.31
(58) Field of Search ............................... 370/238, 254, 370/255, 256, 395.31, 395.32

(56) References Cited

U.S. PATENT DOCUMENTS

| | | | | |
|---|---|---|---|---|
| 5,051,987 A | * | 9/1991 | Conlon ........................ 370/255 |
| 5,265,092 A | * | 11/1993 | Soloway et al. ............ 370/238 |
| 5,491,690 A | * | 2/1996 | Alfonsi et al. .............. 370/238 |
| 5,600,638 A | * | 2/1997 | Bertin et al. ................ 370/255 |
| 5,606,669 A | * | 2/1997 | Bertin et al. ................ 370/256 |
| 5,630,184 A | * | 5/1997 | Roper et al. ................ 709/221 |
| 5,699,351 A | * | 12/1997 | Gregerson et al. ..... 340/825.02 |
| 5,805,593 A | * | 9/1998 | Busche ........................ 370/238 |
| 5,825,772 A | * | 10/1998 | Dobbins et al. ............ 370/396 |
| 5,987,011 A | * | 11/1999 | Toh ............................ 370/255 |

OTHER PUBLICATIONS

D. Bertsekas, "Broadcasting Routing Information: Coping with Link Failures", Data Networks, Chapt. 5, 1992, pp. 418–433.

* cited by examiner

Primary Examiner—Wellington Chin
Assistant Examiner—William Schultz
(74) Attorney, Agent, or Firm—Pillsbury Winthrop LLP

(57) ABSTRACT

Nodes notify each other of the availability situation of links, whereby the link availability situation is reflected in the network topology information held by each node. The designated routing information of a packet which arrives at a local node for subsequent transfer is updated on the basis of the topology of a network from which the following have been removed: any nodes which a packet arriving at the local node for subsequent transfer has already passed; any links directly connected to such nodes; and any congested or faulty links.

2 Claims, 9 Drawing Sheets

COMMUNICATION NETWORK OF LINKED NODES FOR SELECTING THE SHORTEST AVAILABLE ROUTE

CROSS REFERENCE TO RELATED APPLICATIONS

The present invention claims priority from Japanese Patent Applications No. 10-112347 filed Apr. 22, 1998 and No. 11-035848 filed Feb. 15, 1999, the contents of both of which are incorporated hereinto by reference as is our prior U.S. application Ser. No. 09/257,269, filed Feb. 25, 1999.

BACKGROUND OF THE INVENTION

1. Field of the Invention

The present invention relates to communication carried out via a plurality of nodes comprising a network, and to the selection of the shortest route in a network. It relates in particular to a shortest route selection technique which finds an alternative route to one which cannot be used.

2. Description of Related Art

In order to communicate via a network, a route has to be selected between a source and a destination. Transfer of information through a network can involve circuit switching or packet switching. If circuit switching is employed, a destination address carried in a circuit setup signal is used during circuit setup to select a route. If packet switching is employed, a destination address carried in the header of a packet is used to select a route. Note however that if the packet switching involves setting up a virtual circuit rather than using datagrams, the route selection (routing) is carried out when such a circuit is set up.

In both circuit switching and packet switching, routing can be broadly divided into two types in accordance with when a route is selected. The first type involves hop-by-hop routing. In the other type, a source edge node of the network specifies a route all the way to the destination address. In hop-by-hop routing, a setup message for establishing the connection is sent to nodes, which successively select, as the next portion of the route, a hop on which there is surplus bandwidth, the bandwidth requirement being written in the setup message. The term "edge node" can denote either a source node or a destination node.

The second method is called source routing, and its implementation presupposes that a source edge node knows the topology of the network. Packet transfer based on source routing involves forwarding packets via the bridges or LANs indicated by routing information that follows the source address. A source edge node selects and sets up the shortest route to a destination on the basis of network topology information.

The Private Network-Network Interface (PNNI), the specification of which has been established by the ATM Forum, is a representative example of a source routing protocol. A header format which supports source routing is defined in IPv6, which is the standard for the next generation internet protocol (see document RFC1883). Source routing is also carried out by source edge nodes in the burst circuit-switched network disclosed in our prior U.S. application Ser. No. 09/205,612, filed Dec. 4, 1998, the contents of which are incorporated hereinto by reference.

To perform source routing, a source edge node has to know the topology of the network. In the present specification, the "topology of the network" means the configuration of the network. Network topologies include bus, ring, star and mesh configurations. Now suppose that a fault has occurred in a link. If a source edge node performs routing while information to this effect is still propagating towards that node, the routing will be based on out-of-date topology information and it may be impossible to transfer data to the desired destination. Or, if a link on a route is being used by other users, it may be necessary to wait until that link becomes available.

A way to ensure that data transfer can continue under such circumstances is for intermediate nodes on a route to calculate an alternative route. However, a problem has been encountered with this solution, and this will now be described with reference to FIGS. 1 to 5. FIG. 1 illustrates a conventional alternative route selection scheme. FIG. 2 gives an example of a network. FIG. 3 shows an example of a network in which faults have occurred. FIG. 4 gives another example of a network. FIG. 5 shows another example of a network in which a fault has occurred. In FIG. 1, node B lies on the shortest route from node A to node C. Although only nodes A, B and C are shown, it is assumed that there are other nodes between these. In FIG. 1, the shortest route from node B to node C constitutes part of the shortest route from node A to node C. If the link from node B to node C cannot be used, node B could calculate the second shortest route between nodes B and C and select that route. However, as explained below, this method will sometimes result in the formation of a closed-loop route and in a packet being unable to reach the desired destination address.

FIG. 2 shows a network comprising nodes A to L and links 1 to 16. Assuming that the length of each link is the same and that a route is to be selected from node A to node E, the shortest route will be A-B-C-D-E. Node A, which is the source edge node, selects this shortest route and begins the data transfer. Now suppose that due to congestion or fault, link 3 joining nodes B and C cannot be used. This situation is illustrated in FIG. 3. Because link 3, which is part of the shortest route to node E, cannot be used, node B reselects B-F-G-D-E, which is the second shortest route from node B to node E.

Next, when the route selection has reached node F, if link 8 joining node F and node G cannot be used, node F reselects F-H-B-C-D-E, which is the second shortest route from node F to node E. However, because link 3 joining node B and node C cannot be used, when the route selection has arrived back at node B, the route to node F is selected once again, with the result that a closed-loop route is formed.

FIG. 4 shows a network which is the same as the network of FIG. 2 except that node G and links 8 and 9 have been removed. In this example, let us assume that when node B learns that link 3 cannot be used, it selects the route to node F, as shown in FIG. 5. However, if node F does not know that link 3 cannot be used, it will select F-H-B as the second shortest route, and so again a closed-loop route forms. Closed-loop routes form in this manner because nodes capable of routing do not know the state of links other than those to which they are directly connected.

SUMMARY OF THE INVENTION

Given this background, it is an object of the present invention to provide a routing system which, when a link on a route to a destination becomes unusable due to congestion, fault or the like, is still capable of selecting a route to the desired destination. It is a further object of the present invention to provide a routing system capable of increasing network throughput. It is yet another object of the present invention to provide a routing system capable of selecting a route to a target destination even during the signal propagation delay from when a link has become congested or faulty, to the time when information to this effect has been transmitted between all the nodes.

In the present invention, nodes notify each other of the link availability situation, so that if a link becomes unavailable due to congestion or fault, this fact is reflected in network topology information held by each node. When a source edge node is preparing routing information, it uses its network topology information to construct a virtual network in which the unavailable link has been removed, and on this basis selects the shortest route.

However, during the time when the information that a link has become unavailable is being transmitted to the source edge node, there is temporarily a situation in which an unsuccessful route might be selected. To be prepared for this eventuality, the intermediate nodes on the current route likewise construct a virtual network and are able to reselect a shortest route to the desired destination. If a node discovers that a link on this route is unavailable, it uses its network topology information to construct a virtual network in which the unavailable link has been removed. It also removes, from this virtual network, all the nodes lying between the source and the unavailable link, together with any links directly connected to those nodes. In the virtual network thus formed, the shortest route to the destination is selected from the node immediately before the link which has become unavailable. In terms of routing information between the source and destination, the routing information from the node immediately before the first unavailable link is replaced with the newly selected routing information, and routing is continued.

In other words, the present invention relates to a routing system which includes a plurality of nodes and a plurality of links interconnecting these nodes, wherein a source node is provided with means for selecting a route from said source to a destination. A distinguishing feature of the invention is that each of those nodes includes: decision means for deciding whether a link connected to the local node can be used, irrespective of whether a packet is being transferred; notifying means for notifying the other nodes of the decision made by this decision means; and topology reproducing means for virtually reproducing the topology of the network in accordance with the link availability situation notified by the notifying means. A further distinguishing feature of the invention is that each node also includes selecting means for selecting a route from source to destination over the network that has been reproduced virtually by the topology reproducing means; and generating means which generates designated routing information in accordance with the route selected by the selecting means. The designated routing information is written in a packet for transfer.

As a result, even if a link on a route becomes unavailable due to congestion, fault or the like, a route to the desired destination can be selected. Network throughput can therefore be increased.

The above mentioned topology reproducing means which virtually reproduces the topology of the network preferably includes updating means which updates the topology every time the link availability situation changes. Alternatively, the topology reproducing means can include updating means which updates the topology periodically irrespective of whether the link availability situation has changed, and the topology of the virtually reproduced network can be set to that of the actual network.

The selecting means for selecting a route can include order selecting means whereby the order of selection starts from the route with the fewest intermediate nodes, whereby the shortest route can be selected.

Preferably, the topology reproducing means also includes topology updating means which virtually reproduces the topology of a network from which the following have been removed: any nodes which a packet arriving at the local node for subsequent transfer has already passed; any links directly connected to such nodes; and any congested or faulty links; plus updating means which updates the designated routing information of a packet arriving at the local node for subsequent transfer, in accordance with the update produced by this topology updating means. As a result, even if the designated routing information of a packet has been formed while the information that a link has become unavailable is still being transmitted to an edge node, an intermediate node can rewrite the correct designated routing information in the packet.

DETAILED DESCRIPTION OF THE PREFERRED EMBODIMENTS

Figure 6:
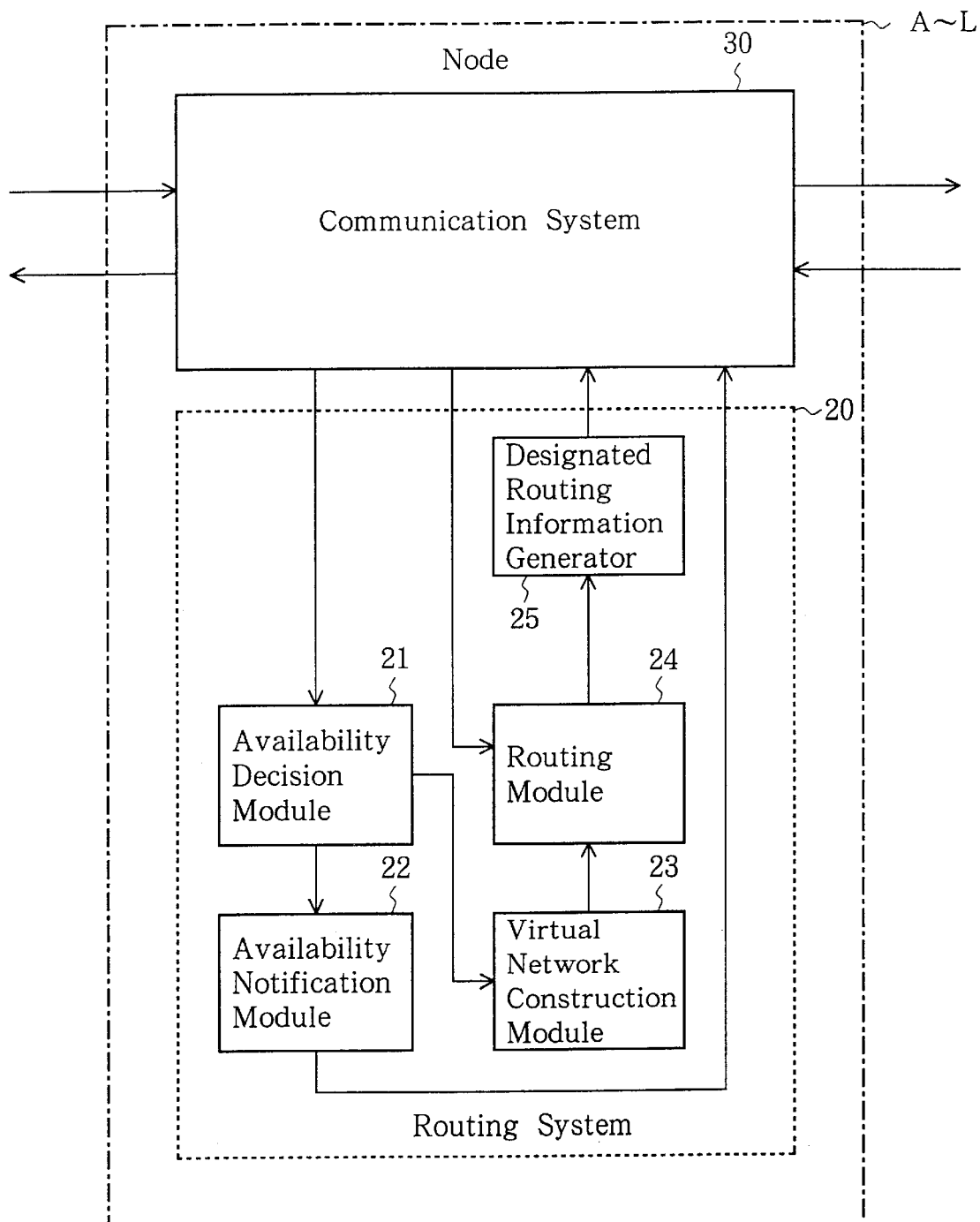
FIG. 6 is a block diagram of the main parts of a routing system according to an embodiment of the present invention.

An embodiment of the present invention is explained with reference to FIG. 6 and FIG. 7. FIG. 6 shows the main components of a node in this embodiment, and FIG. 7 gives an example of faults having occurred in a network.

Figure 7:
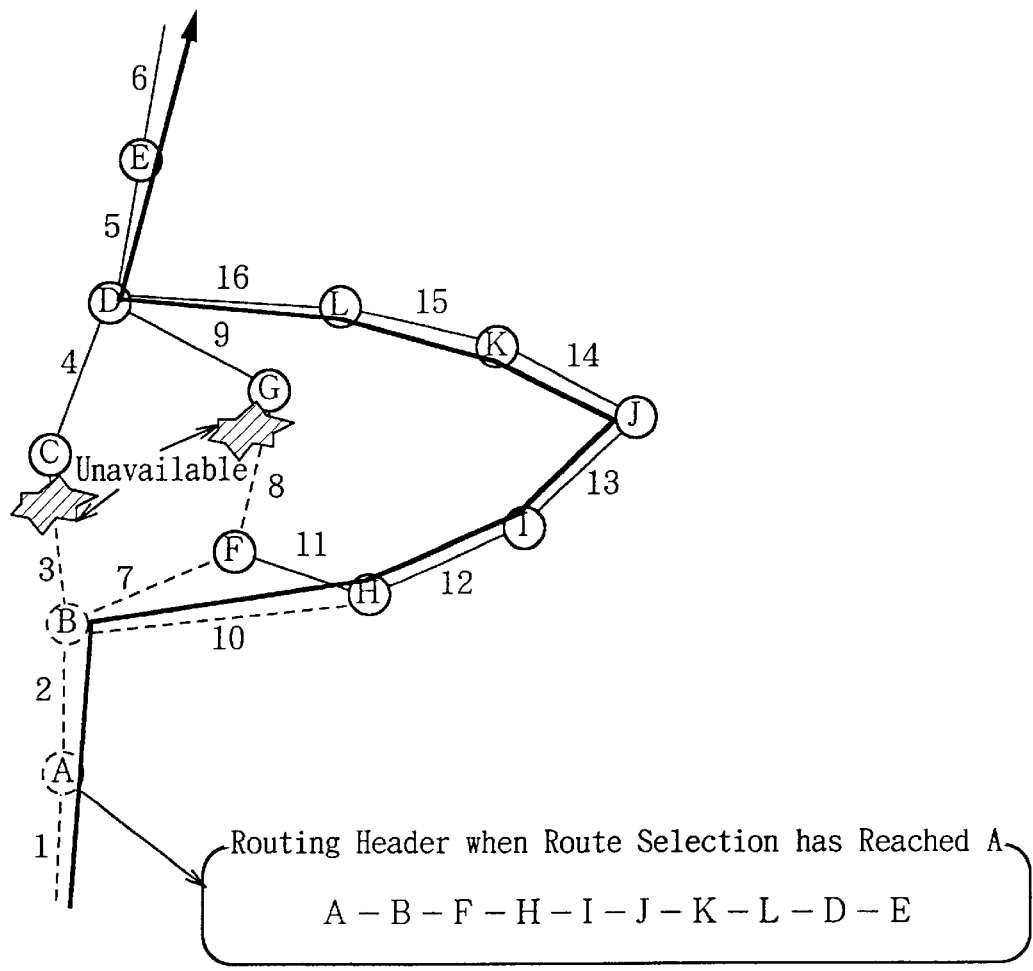
FIG. 7 shows an example of faults having occurred in a network and serves to explain an example of routing.

As shown in FIG. 7, this embodiment of the present invention comprises a plurality of nodes A to L and a plurality of links 1 to 16 interconnecting these nodes. As shown in FIG. 6, each node comprises routing system 20 which is provided with routing module 24, this being selecting means for selecting the shortest route from source to destination.

A distinguishing feature of the present invention is that each node A to L further includes: availability decision module 21 serving as decision means for deciding whether a link connected to the local node can be used, irrespective of whether a packet of information is being transferred through the network; availability notification module 22 serving as notifying means for notifying the other nodes A to L of the decision made by availability decision module 21; and virtual network construction module 23 serving as means for virtually reproducing, within the local node, the topology of the network, this being done in accordance with the link availability situation notified by availability notification module 22. A further distinguishing feature of the invention is that each node A to L also includes designated routing information generator 25 serving as generating means which, once routing module 24 has selected the shortest route from source to destination over the network that has been reproduced virtually by virtual network construction module 23, generates designated routing information in accordance with the route selected by routing module 24. The designated routing information is written in a packet for transfer.

In this embodiment, virtual network construction module 23 updates the topology every time the availability situation of any link 1 to 16 changes. Alternatively, however, it can update the topology periodically irrespective of whether the availability situation of a link has changed.

Routing module 24 selects routes starting from the route with the fewest intermediate nodes. Routing module 24 also confirms the availability situation of a designated route in accordance with designated routing information which it receives, and when as a result of this confirmation a route has been newly recognized as being unavailable, it changes the designated route so as to bypass the route which has been confirmed as being unavailable.

Data transfer is handled by communication system 30. During data transfer, any link availability information is input from communication system 30 to availability decision module 21, and any information relating to the destination to which data is to be transferred is input from communication system 30 to routing module 24. Availability notification information for other nodes is transferred from availability notification module 22 to other nodes by way of communication system 30. After routing module 24 has selected a route in accordance with the information relating to the destination to which data is to be transferred, designated routing information generator 25 generates designated routing information in accordance with the selected route and inputs this to communication system 30, which transfers data on the basis of this designated routing information. The designated routing information is transferred along with the data being transferred.

Virtual network construction module 23 virtually reproduces the topology of a network from which the following have been removed: any nodes which a packet arriving at the local node for subsequent transfer has already passed, any links directly connected to such nodes, and any congested or faulty links. Designated routing information generator 25 updates the designated routing information of a packet arriving at the local node for subsequent transfer, in accordance with the update produced by virtual network construction module 23.

Within the routing system 20, the processing flow may be as follows: Step 1: discriminate unusable links by information notified by the other nodes whether each link is useable or not. Step 2: virtually reproduce a topology of the network taken away the unusable links to select the shortest route from the source node to the designation node on the topology.

Packet transfer is handled by communication system 30. During packet transfer, any link availability information is input from communication system 30 to availability decision module 21, and any information relating to the destination of the packet to be transferred is input from communication system 30 to routing module 24. Availability notification information for other nodes is transferred from availability notification module 22 to other nodes by way of communication system 30. After routing module 24 has selected a route in accordance with the information relating to the destination to which the packet is to be transferred, designated routing information generator 25 generates designated routing information in accordance with the selected route and inputs this to communication system 30, which transfers the packet on the basis of this designated routing information. This designated routing information is transferred as header information of the packet being transferred.

Figure 1:
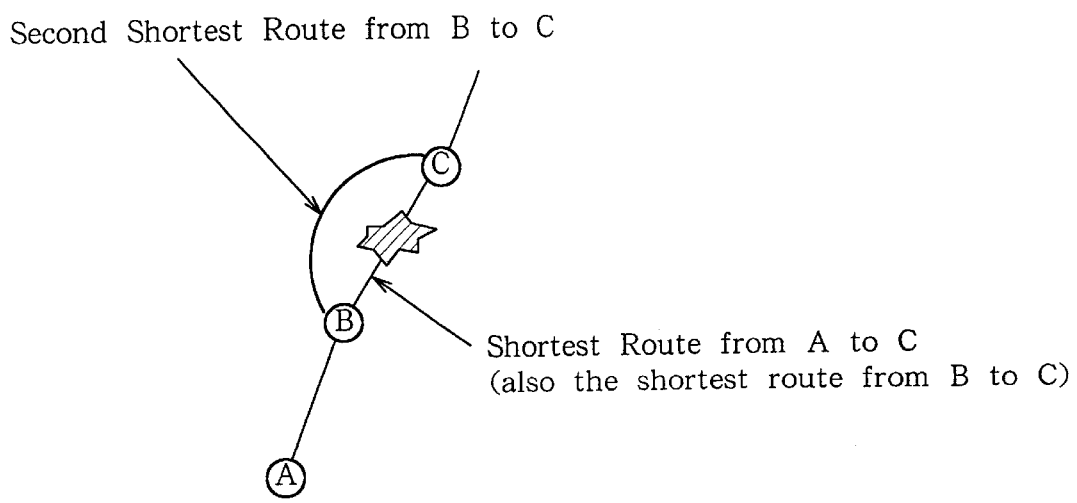
FIG. 1 illustrates a conventional alternative route selection scheme.
Figure 2:
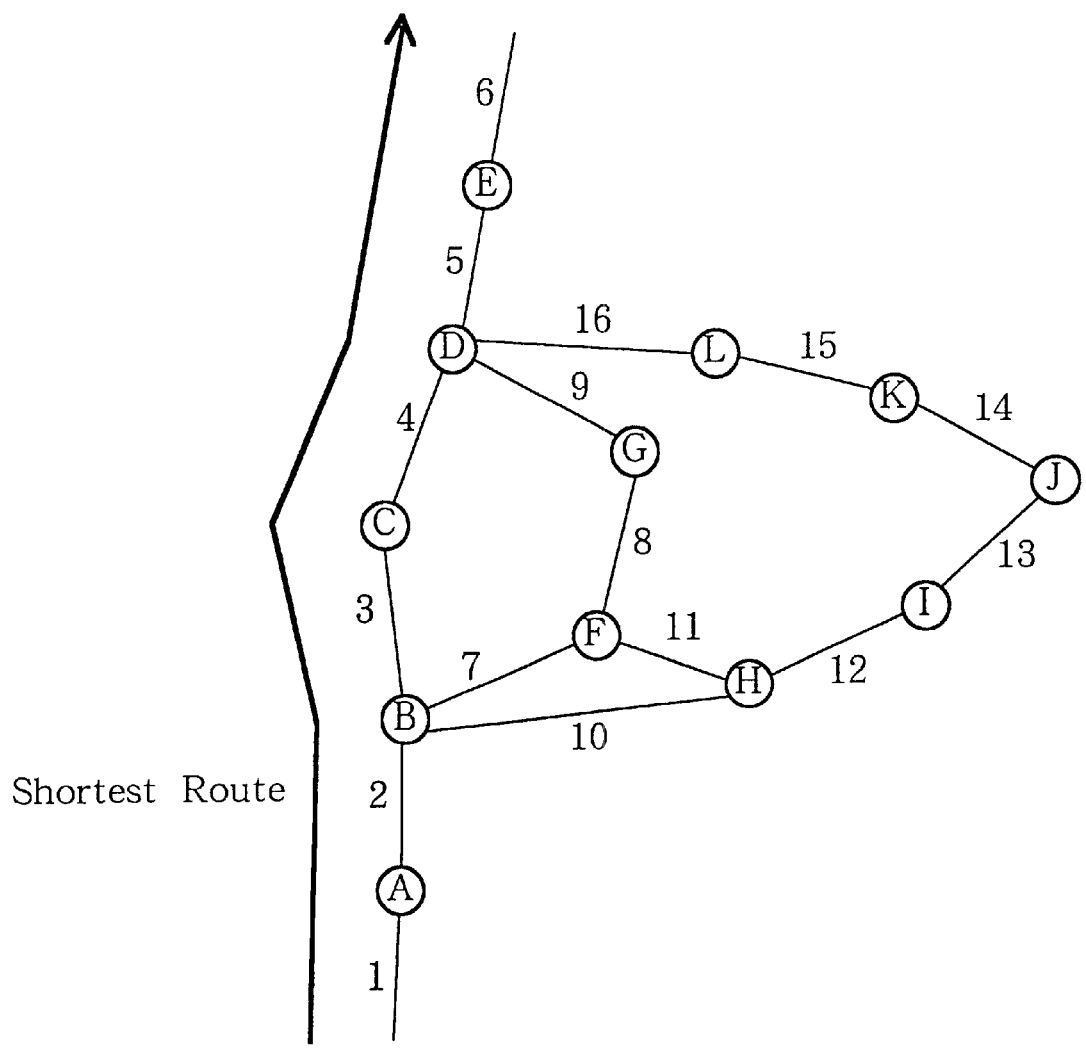
FIG. 2 gives an example of a network.
Figure 3:
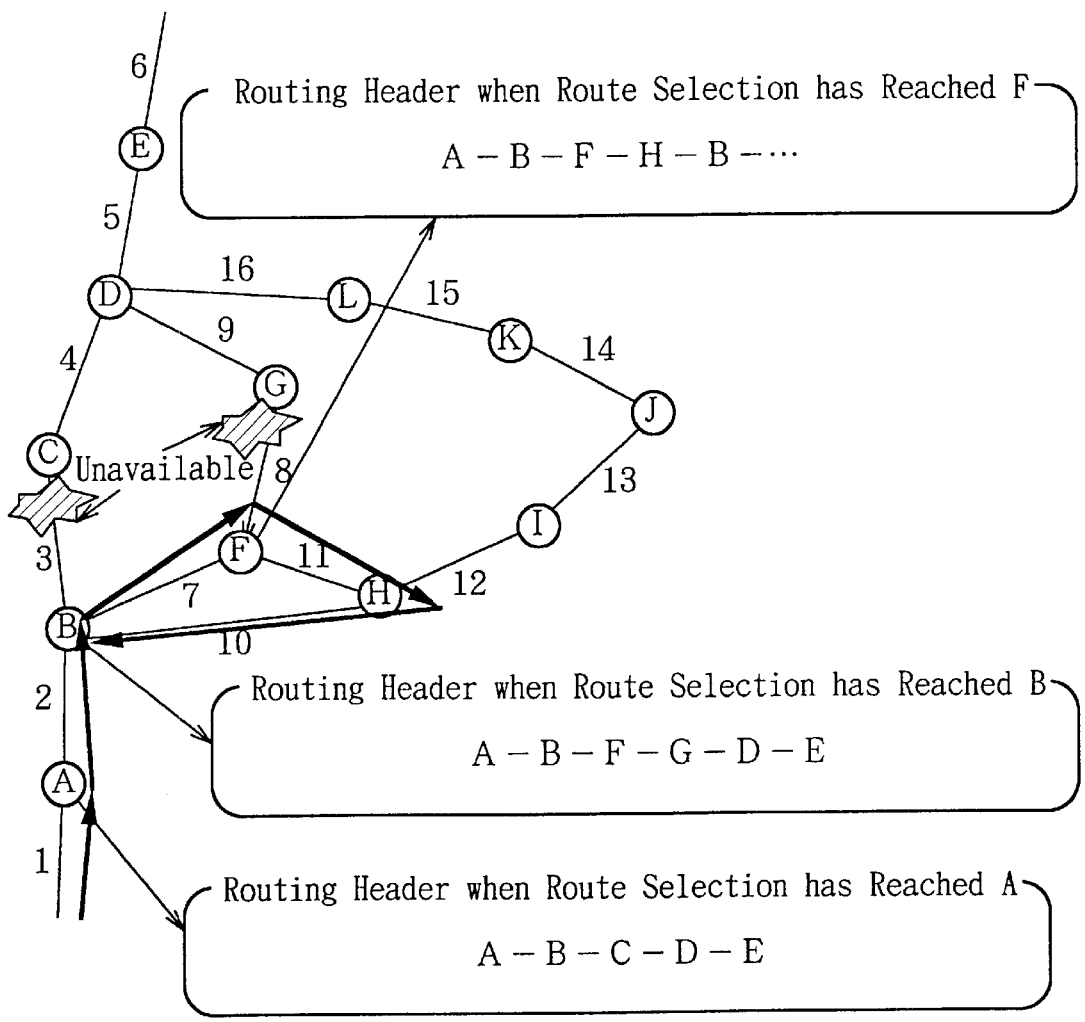
FIG. 3 shows an example of a network in which faults have occurred.

An example of routing will now be explained with reference to FIG. 7 and FIG. 8. In this example, it is assumed that a route is to be selected from node A to node E in the network of FIG. 2 when link 3 between nodes B and C, and link 8 between nodes F and G, have become unavailable.

First of all, as an element of conventional operation, the nodes notify each other that link 3 and link 8 have become unavailable, whereby this fact is reflected in the network topology information held by each node. The information that a link has become unavailable can be transmitted to all nodes in the network by using a method such as that described in section 5.3 (pp.418–433) of "Data Networks" by D. Bertsekas and R. Gallager (2nd edition, Prentice Hall, 1992) which is incorporated hereinto by reference. To describe this method very briefly, when a fault occurs in a link adjacent to a certain node, that node places a number identifying the faulty link in a message which it broadcasts to links other than the one in which the fault occurred. When a node adjacent to this node receives this message, it broadcasts the message to links other than the link via which it received the message. To avoid duplication of messages bearing the same information, messages are given a message identifier enabling them to be identified, and if a message has already been received, it is not broadcast to other nodes. Information relating to the faulty link can be propagated throughout the network in this way.

On the basis of the information thus obtained, namely, that links 3 and 8 cannot be used, node A calculates the shortest route from node A to node E, using the network topology information of the virtual network constructed by removing link 3 and link 8 from the network topology information of the complete network. Node A therefore selects a route, forming A-B-H-I-J-K-L-D-E as the routing information. As a result, the shortest route can be selected without using a link which has become unavailable.

Next, an explanation will be given of the case where A-B-C-D-E is selected by node A as the shortest route to node E after link 3 and link 8 have become unavailable, but during the period when information to this effect is still propagating to node A.

Because node A does not know that link 3 and link 8 have become unavailable, it uses network topology information and selects A-B-C-D-E as the shortest route from node A to node E. Next, when a packet reaches node B, because node B knows that link 3 is unavailable, it creates a virtual network image from which node A and links 2 and 3 have been removed, and calculates the shortest route from node B to node E.

Because B-F-G-D-E is the shortest route in this virtual network, new routing information A-B-F-G-D-E is obtained by replacing the B-C-D-E portion of the original routing information A-B-C-D-E with B-F-G-D-E.

Figure 8:
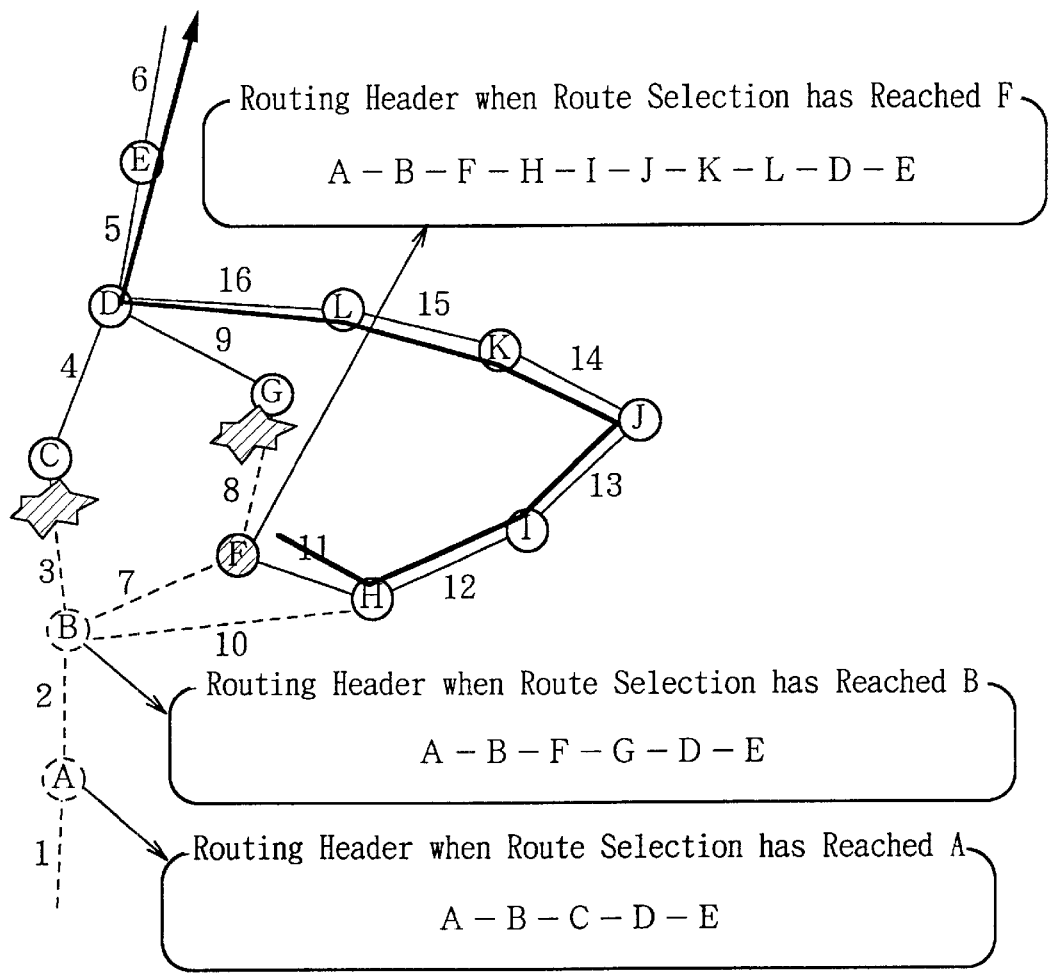
FIG. 8 serves to explain an example of routing.

Next, as shown in FIG. 8, when a packet reaches node F, because node F knows that link 8 is unavailable, it creates a virtual network image from which nodes A and B and links 1, 2, 3, 7, 10 and 8 have been removed, and calculates the shortest route from node F to node E. Because F-H-I-J-K-L-D-E is the shortest route in this virtual network, new routing information A-B-F-H-I-J-K-L-D-E is obtained by replacing the F-G-D-E portion of the previous routing information A-B-F-G-D-E (which applied when the packet arrived at node F) with F-H-I-J-K-L-D-E.

Thus, even if link 3 and link 8 are unavailable, and node A and node B are unaware of the unavailability of these respective links, the shortest route from node A to node E can still be selected.

Figure 4:
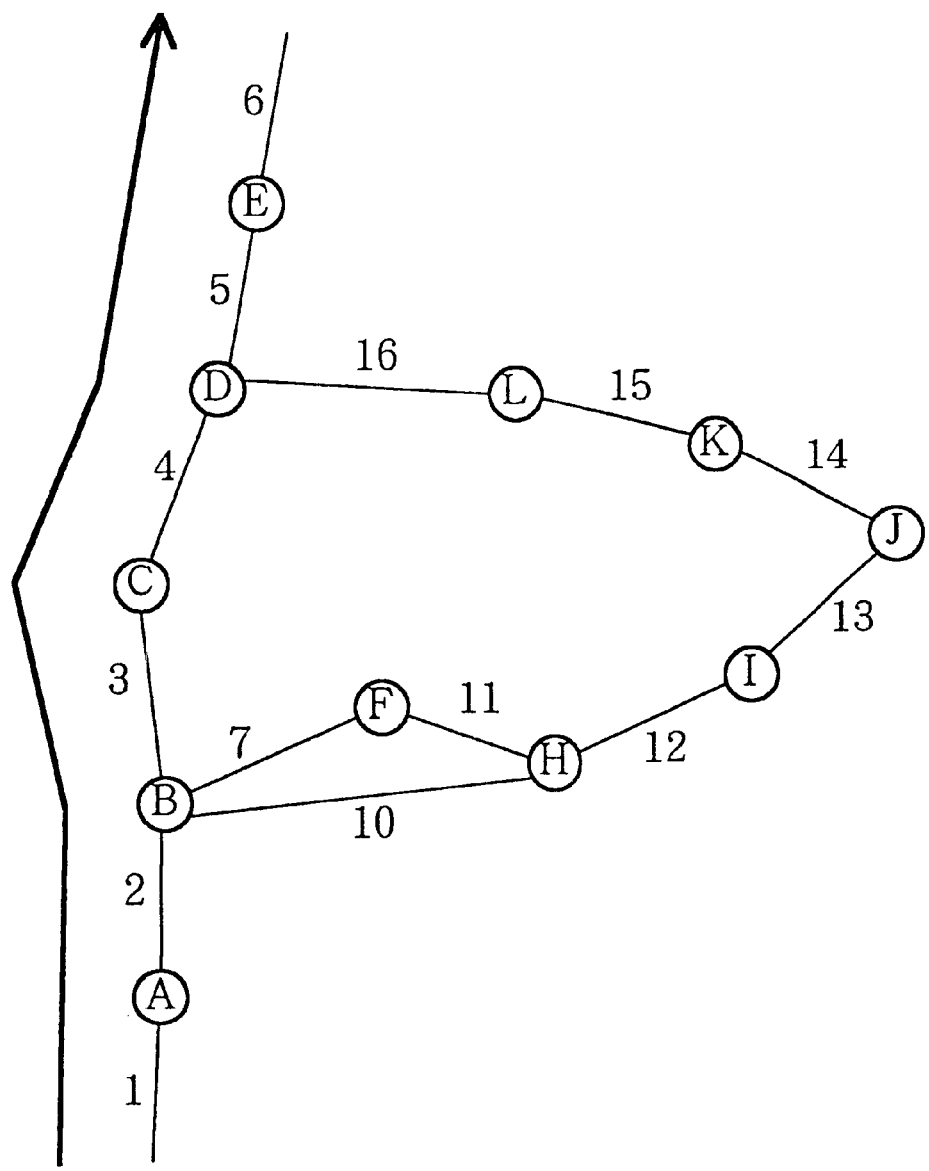
FIG. 4 gives another example of a network.
Figure 5:
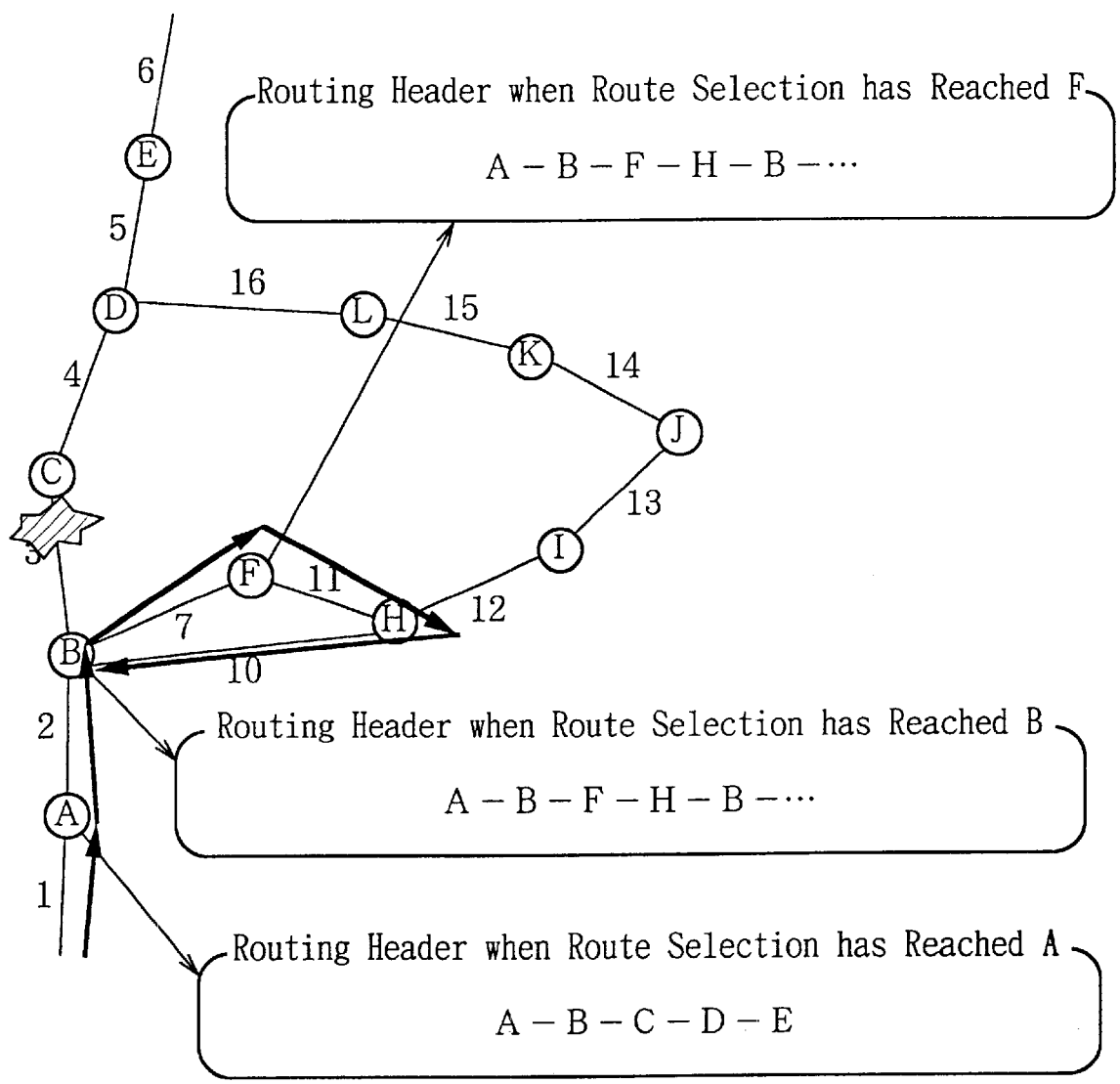
FIG. 5 shows another example of a network in which a fault has occurred.
Figure 9:
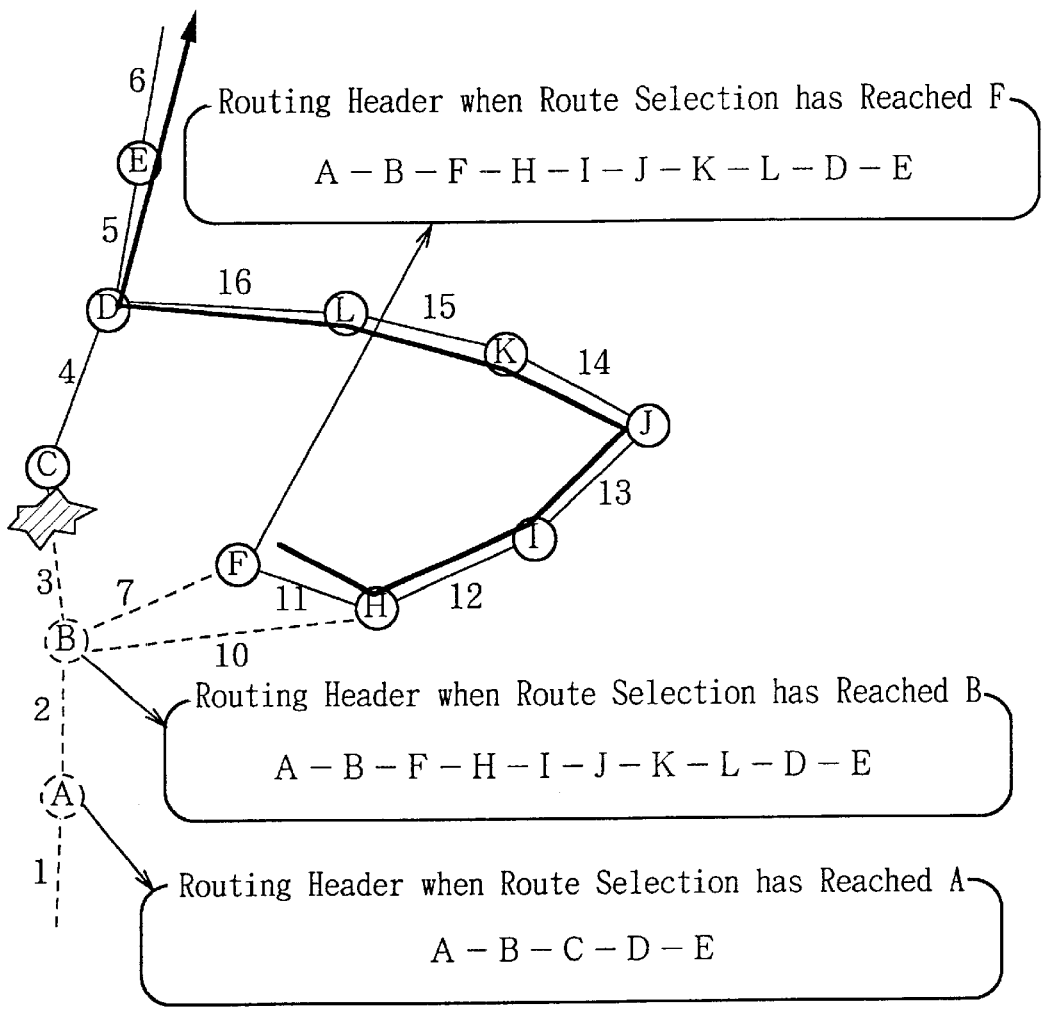
FIG. 9 serves to explain another example of routing.

Another example of routing will now be explained with reference to FIG. 9. In this example, it is assumed that in the network illustrated in FIG. 4, A-B-C-D-E is selected by node A as the shortest route to node E after link 3 has become unavailable, but during the period when information to this effect is still propagating to node A.

Because node A does not know that link 3 has become unavailable, it uses network topology information and selects A-B-C-D-E as the shortest route from node A to node E. Next, when a packet reaches node B, because node B knows that link 3 is unavailable, it creates a virtual network image from which node A and links 2 and 3 have been removed, and calculates the shortest route from node B to node E.

Let us assume that B-F-H-I-J-K-L-D-E is the shortest route in this virtual network. Accordingly, new routing information A-B-F-H-I-J-K-L-D-E is obtained by replacing the B-C-D-E portion of the original routing information A-B-C-D-E with B-F-H-I-J-K-L-D-E. Subsequent packets are routed along this route.

Thus, even if link 3 is unavailable and node A is unaware of this, the shortest route from node A to node E can still be selected.

With a conventional routing system, a closed-loop route sometimes formed when a link on a route was unavailable due to congestion or fault. This problem arises because the node performing routing does not know the state of links other than those directly connected to it. As opposed to this, according to the present invention, if a link on a route becomes unavailable due to congestion, fault or the like, the shortest route is reselected in a virtual network from which the following have been removed: any nodes which have already been passed, any links connected to such nodes, and any links known to have become unavailable. As a result, even when a link on a route has become unavailable due to congestion, fault or the like, selection of a closed-loop route can be avoided and a proper route to the target destination can be selected.

As has been explained above, the present invention can select a route to the desired destination even when a link on a route has become unavailable due to congestion, fault or the like. It can also select a route to the target destination during the signal propagation delay from when a link has become congested or faulty, to the time when information to this effect has been transmitted between all the nodes. As a result, network throughput can be increased.

What is claimed is:

1. A data transmission network including a plurality of nodes and a plurality of links interconnecting said nodes, wherein each of said plurality of nodes comprises:

a decision module configured to decide whether a link connected to a respective one of said nodes is available to transfer data, irrespective of whether data is being transferred through said network;

a notification module configured to notify others of said nodes of a decision made by said decision module;

a topology reproduction module configured to virtually reproduce a topology of the network in accordance with link availability as notified by said notification module;

a route selection module configured to select a shortest route to transfer data packets as header information to a destination node over the virtually-reproduced network topology provided by said topology reproduction module, the shortest path containing the fewest number of intermediate nodes the data is routed through before reaching the destination mode; and a route generation module configured to generate and designate routing information as header information in accordance with the shortest route selected by said route selection module, wherein, in response to being notified by said notification module, said topology reproduction module updates the virtually-reproduced network topology by deleting from the topology: (a) any local node having already received and having already transferred data; (b) any links directly connected to such nodes, (c) any congested links, and (d) any faulty links, and wherein topology reproduction module updates said designated routing information of data arriving at the local node for subsequent transfer, in accordance with the updated, virtually-reproduced network topology.

2. A routing system for a data transmission network including a plurality of nodes, at least one of which is a source node, and a plurality of links interconnecting said nodes, said routing system being included in said source node, said routing system comprising:

a decision module configured to decide whether a link connected to a respective one of said nodes is available to transfer data, irrespective of whether data is being transferred through said network;

a notification module configured to notify others of said nodes of a decision made by said decision module;

a topology reproduction module configured to virtually reproduce a topology of the network in accordance with link availability as notified by said notification module;

a route selection module configured to select a shortest route to transfer data packets as header information to a destination node over the virtually-reproduced network topology provided by said topology reproduction module, the shortest path containing the fewest number of intermediate nodes the data is routed through before reaching the destination mode; and a route generation module configured to generate and designate routing information as header information in accordance with the shortest route selected by said route selection module, wherein, in response to being notified by said notification module, said topology reproduction module updates the virtually-reproduced network topology by deleting from the topology: (a) any local node having already received and having already transferred data, (b) any links directly connected to such nodes, (c) any congested links, and (d) any faulty links, and wherein topology reproduction module updates said designated routing information of data arriving at the local node for subsequent transfer, in accordance with the updated, virtually-reproduced network topology.

* * * * *